(12) United States Patent
Blanchet

(10) Patent No.: US 9,122,868 B2
(45) Date of Patent: Sep. 1, 2015

(54) METHOD FOR SECURING A TRANSACTION PERFORMED WITH A PROGRAMMABLE PORTABLE DEVICE

(75) Inventor: Jean-Bernard Blanchet, Aix-en-Provence (FR)

(73) Assignee: Inside Secure, Aix-en-Provence, Cedex (FR)

( * ) Notice: Subject to any disclaimer, the term of this patent is extended or adjusted under 35 U.S.C. 154(b) by 1170 days.

(21) Appl. No.: 12/534,944

(22) Filed: Aug. 4, 2009

(65) Prior Publication Data

US 2010/0037322 A1 Feb. 11, 2010

(30) Foreign Application Priority Data

Aug. 5, 2008 (FR) ...................................... 08 04450

(51) Int. Cl.
*G06Q 99/00* (2006.01)
*G06F 21/52* (2013.01)
*G06Q 20/30* (2012.01)
*G06Q 20/32* (2012.01)

(52) U.S. Cl.
CPC .............. *G06F 21/52* (2013.01); *G06Q 20/30* (2013.01); *G06Q 20/32* (2013.01); *G06Q 20/327* (2013.01); *G06Q 20/3278* (2013.01)

(58) Field of Classification Search
CPC ..... G06Q 20/30; G06Q 20/32; G06Q 20/327; G06Q 20/3278
USPC .................................. 705/26.1, 26.82, 64, 75
See application file for complete search history.

(56) References Cited

U.S. PATENT DOCUMENTS

| 5,770,844 | A | 6/1998 | Henn | |
|---|---|---|---|---|
| 7,360,247 | B2* | 4/2008 | Girard et al. | ..................... 726/20 |
| 7,954,723 | B2* | 6/2011 | Charrat | ......................... 235/492 |
| 2004/0088555 | A1* | 5/2004 | Girard et al. | .................. 713/192 |
| 2006/0131386 | A1 | 6/2006 | Takano | |
| 2007/0113120 | A1 | 5/2007 | Dodge | |
| 2007/0263596 | A1* | 11/2007 | Charrat | ......................... 370/351 |
| 2008/0162312 | A1* | 7/2008 | Sklovsky et al. | ............... 705/35 |
| 2009/0198605 | A1* | 8/2009 | Ganzera et al. | .................. 705/35 |

FOREIGN PATENT DOCUMENTS

DE 195 39 801 A1 4/1997
WO 01/92996 A1 12/2001

* cited by examiner

*Primary Examiner* — James D Nigh
(74) *Attorney, Agent, or Firm* — Panitch Schwarze Belisario & Nadel LLP

(57) ABSTRACT

A method for securing a transaction between a transaction device and an external device is described. The transaction device includes a communication controller, an application processor, and an input device. The method includes requiring the user to enter agreed transaction data via the input device, monitoring the transaction data designated to be sent to the external device or received from the external device, and preventing the transaction data designated to be sent from being sent to the external device if the transaction data designated to be sent is different from the agreed transaction data, or rejecting the received transaction data if the received transaction data is different from the agreed transaction data.

15 Claims, 7 Drawing Sheets

METHOD FOR SECURING A TRANSACTION PERFORMED WITH A PROGRAMMABLE PORTABLE DEVICE

BACKGROUND OF THE INVENTION

Embodiments of the present invention relate to a transaction device for performing a transaction with an external device through a communication link.

Embodiments of the present invention also relate to a method for securing a transaction between a transaction device and an external device, in particular a transaction made with a programmable portable device.

Nowadays, transactions can be performed using conventional portable devices such as, for example, mobile telephones, personal digital assistants (PDAs), or the like. In fact, wireless or contactless communication technology can easily be embedded in such portable devices for the establishment of wireless or contactless communication with an external device in order to perform transactions.

FIG. 1 shows an example of a conventional transaction device 1 with Near Field Communication (NFC) communication capabilities. Essentially, the transaction device includes an NFC communication controller 10, an application processor 20, a display device 31, and an input device 32 linked to the application processor 20.

The NFC communication controller 10 includes an antenna coil that allows a contactless data link CDL to be established with an external NFC device 40, which can be, for example, a payment terminal, a cash machine, or the like. The external device 40 is also equipped with an antenna coil and both the external device and the NFC communication controller can exchange data by inductive coupling.

Inside the transaction device 1, the communication controller 10 is coupled with at least one data and program memory 11, in which a program executed by the controller 10 is stored. The application processor 20 is coupled with at least one data and program memory 21 in which application programs are stored.

Additionally, the transaction device 1 typically includes another communication interface 22 through which it can receive application programs APP which are stored in memory 21 and executed by the application processor 20. It is assumed here that at least one application program APP has been downloaded to manage a transaction through the contactless data link CDL.

By nature, such a conventional portable device is much less secure than a certified and secured payment device, such as those found in shops or banks. In particular, the application processor 20, in which application programs APP can be downloaded and installed using the communication interface 22, may contain malicious software. This malicious software can be designed to intercept or corrupt transaction data in paid applications, such as payment of a restaurant bill, withdrawal of money from a cash machine, payment for access to a specific location (e.g., subway, museum, nightclub, or the like), or the like. Consequently, such a corruption of transaction data may lead to the payment of an amount greater than that expected by the user.

For example, a transaction may be initiated and a connection (data link CDL) may be established between the transaction device 1 and the external device 40. The external device 40 sends the transaction data to the transaction device 1. The amount is displayed on the display device 31 and the user is then prompted to confirm acceptance of payment of the indicated amount of money by entering an acknowledgement through the input device 32 (for example, by selecting "Yes" or "No," by entering a personal code as an acknowledgment, or both). The application processor then forwards this acknowledgment to the external device 40 in order to complete the transaction. Malicious software may corrupt the application program APP so that the transaction is performed with transaction data that is different from the data displayed to and/or accepted by the user. As an example, a transaction for an amount of 1000€ may be initiated by the malicious software, whereas an amount of 10€ is displayed to the user. In this case, 1000€ are actually paid instead of the 10€ that the user accepted to pay.

Therefore, it is desirable to provide a method for securing a transaction made with a transaction device that may be corrupted by malicious software, in particular a transaction made with a conventional programmable portable device.

BRIEF SUMMARY OF THE INVENTION

One embodiment of the present invention relates to a method for securing a transaction between a transaction device and an external device. The transaction device includes a communication controller, an application processor, and an input device. The transaction includes the exchange of application data between the transaction device and the external device, and the transmission of transaction data from the transaction device to the external device or from the external device to the transaction device. The method of securing the transaction includes requiring a user to enter agreed transaction data via the input device, monitoring the transaction data designated to be sent to the external device or received from the external device, and preventing the transaction data from being sent to the external device if the transaction data designated to be sent is different from the agreed transaction data, or rejecting the received transaction data if the received transaction data is different from the agreed transaction data.

According to one embodiment, the method includes interrupting the transaction rather than preventing transaction data from being sent or rejecting received transaction data.

According to one embodiment, the method further includes capturing and storing by the communication controller the agreed transaction data entered by the user, monitoring by the communication controller the transaction data designated to be sent to the external device or received from the external device, and configuring the communication controller to refuse to send transaction data designated to be sent that is different from the agreed transaction data, or rejects received transaction data that is different from the agreed transaction data.

According to one embodiment, the method further includes applying to the communication controller a command requesting the communication controller to capture and memorize the agreed transaction data before requiring the user to enter agreed transaction data.

According to one embodiment, the method further includes applying a predetermined command to the communication controller when transaction data is to be sent to the external device, providing the communication controller with the transaction data designated to be sent, configuring the communication controller to monitor the transaction data in response to the predetermined command, and sending the transaction data with one of predetermined encapsulation data and predetermined accompanying data if the transaction data designated to be sent is identical to the agreed transaction data.

According to one embodiment, the method includes configuring the external device to reject transaction data that is not one of encapsulated with the predetermined encapsulation data and accompanied with the predetermined accompanying data.

According to one embodiment, the method further includes sending application data to the transaction device using a predetermined data frame, in response to the reception of the predetermined data frame, comparing the transaction data present in the predetermined frame to the agreed transaction data via the communication controller.

One embodiment of the present invention relates to a communication controller, an application processor to perform transactions with an external device through the communication controller, and an input device. The transaction device is configured to require the user to enter agreed transaction data via the input device in the course of a transaction, monitor the transaction data designated to be sent to the external device or received from the external device, and prevent the transaction data designated to be sent from being sent to the external device if the transaction data designated to be sent is different from the agreed transaction data, or to reject the received transaction data if the received transaction data is different from the agreed transaction data.

According to one embodiment, the transaction device is configured to interrupt a transaction when the transaction data designated to be sent is different from the agreed transaction data, or when received transaction data is different from the agreed transaction data.

According to one embodiment, the communication controller is configured to capture and store the agreed transaction data entered by the user, monitor the transaction data designated to be sent to the external device or received from the external device, and refuse to send transaction data designated to be sent that is different from the agreed transaction data, or reject received transaction data that is different from the agreed transaction data.

According to one embodiment, the application processor is configured to require the user to enter agreed transaction data, and to apply to the communication controller a command requesting the communication controller to capture and store the agreed transaction data before requiring the user to enter the agreed transaction data.

According to one embodiment, the application processor is configured to apply a predetermined command to the communication controller when transaction data is to be sent to the external device, and to provide the communication controller with the transaction data designated to be sent. The communication controller is configured to monitor the transaction data in response to the predetermined command, and send the transaction data using one of predetermined encapsulation data or predetermined accompanying data if the transaction data designated to be sent is identical to the agreed transaction data.

According to one embodiment, the communication controller is configured to, in response to the reception of a predetermined data frame including transaction data, compare the transaction data present in the predetermined data frame to the agreed transaction data.

According to one embodiment, the communication controller is an NFC controller.

According to one embodiment, the application processor is one of a baseband processor of a mobile phone and the main processor of a Personal Digital Assistant.

One embodiment of the present invention relates to a transaction system, comprising a transaction device as described above and an external device configured to perform a transaction with the transaction device.

According to one embodiment, the external device is configured to refuse transaction data that is not one of encapsulated with predetermined encapsulation data and accompanied with predetermined accompanying data According to one embodiment, the external device is configured to send application data to the transaction device using a predetermined data frame.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

Embodiments of the present invention will be described in greater detail in the following description, in connection with, but not limited to, the following figures.

DETAILED DESCRIPTION OF THE INVENTION

Figure 1:
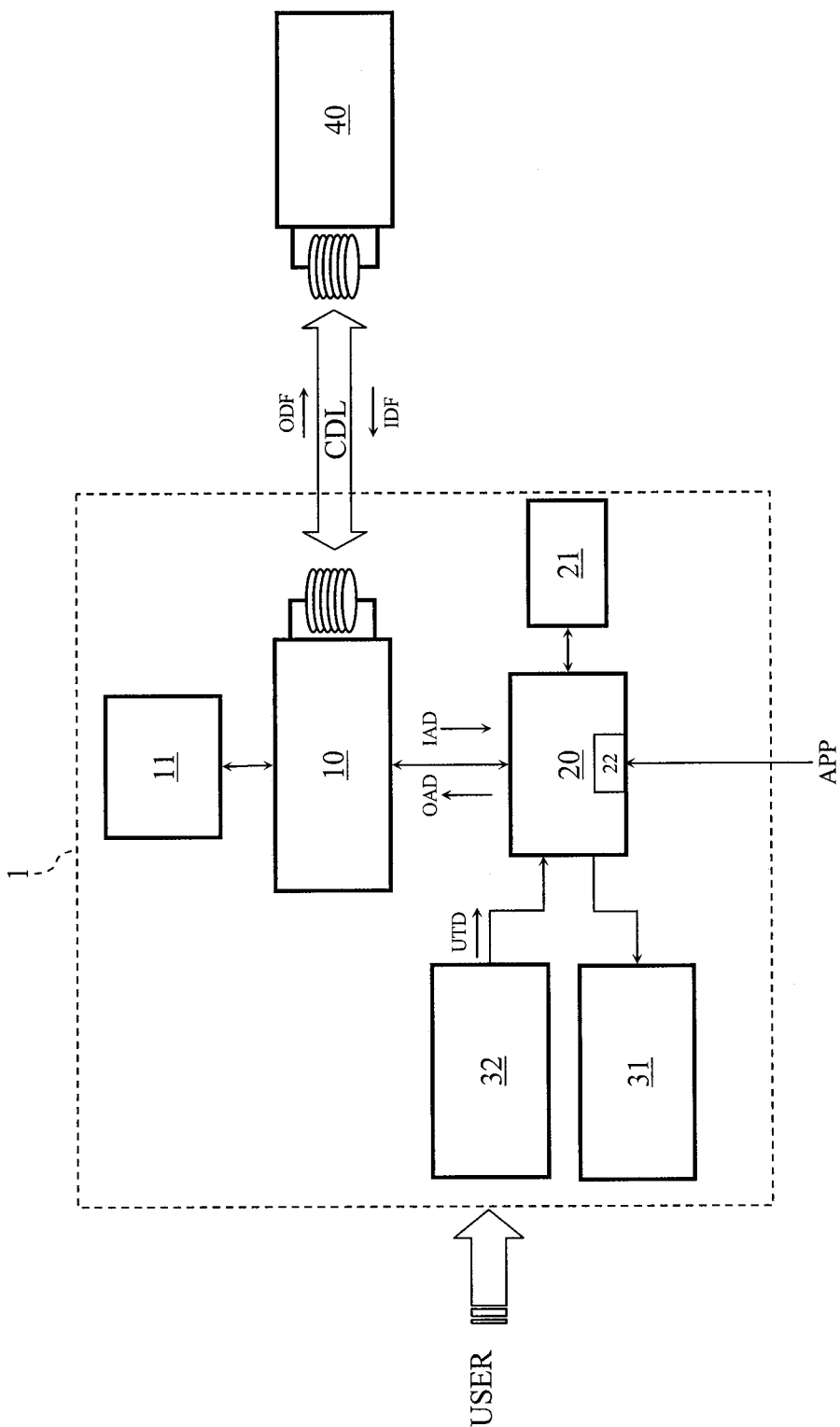
FIG. 1 is a schematic block diagram of a conventional transaction device.
Figure 2:
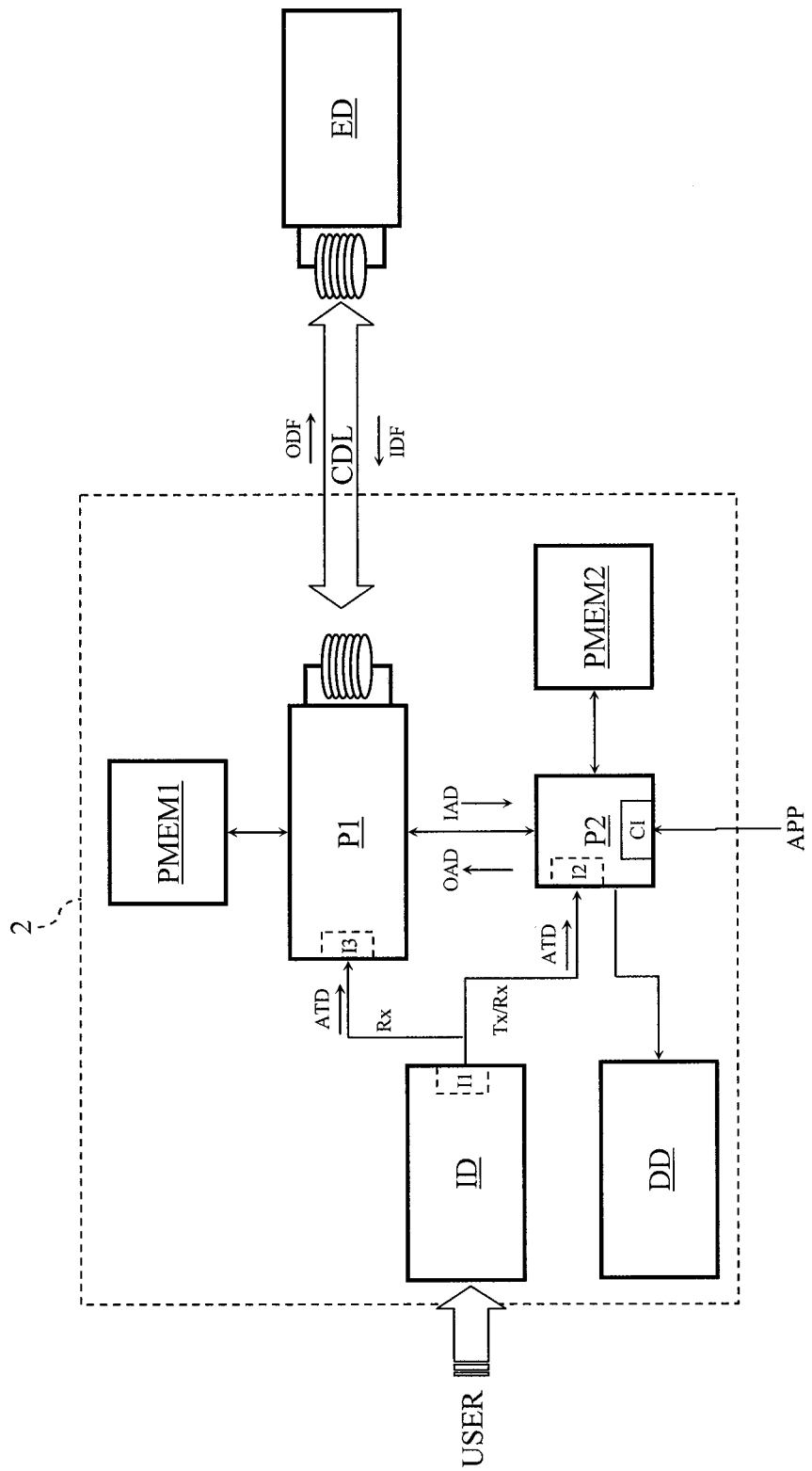
FIG. 2 is a schematic block diagram of a transaction device according to certain preferred embodiments of the present invention.

FIG. 2 shows schematically, in block form, a transaction device 2 according to an embodiment of the present invention, for example a mobile phone or a PDA. Similar to the transaction device 1 described above in connection with FIG. 1, the transaction device 2 includes a communication controller P1 and at least one application processor P2. The communication controller P1 is, for example, an NFC controller with an antenna coil able to send and receive data through a contactless data link CDL to and from an external device ED. The external device ED can be any type of NFC user-interaction portal and is also equipped with an antenna coil. The communication controller P1 is coupled with at least one data and program memory PMEM1 in which a program executed by the communication controller is stored. Likewise, the application processor P2 is coupled with at least one data and program memory PMEM2, and can be, for example, the baseband processor of a mobile phone, the main processor of a PDA, or the like. Other host processors, not shown, such as a Subscriber Identity Module (SIM) or other secured element may be included in the transaction device and connected to the communication controller P1.

The transaction device 2 also includes a display device DD and an input device ID which are linked to the application processor P2. The input device ID can be, for example, a keypad, a microphone, a biometric input, a combination of these elements, or any other similar device allowing a user to input information.

Additionally, the transaction device includes at least one communication interface, such as a wireless interface (Wi-Fi), a radio interface of the Global Standard for Mobile Communications (GSM)-type, a Universal Serial Bus (USB) port, an Ethernet port, or the like, or a combination of these elements that are schematically represented as a communication interface CI of the application processor 20. Through this interface CI, the transaction device 2 can receive application programs APP that are stored in memory PMEM2 and are executed by the application processor 20.

As indicated above, an application program may contain malicious software designed to corrupt transaction data.

On the other hand, it is known that memory PMEM1 is incorruptible by malicious software as it is programmed in the factory and is not user-accessible. Embodiments of the present invention are based on this observation, and rely on the communication controller P1 to verify that transaction data exchanged between the application processor P2 and the external device ED are not corrupted.

According to one aspect of embodiments of the present invention, the controller P1 is also linked to the input device ID so that it can also capture data entered by the user. For example, both the input device ID and the application processor P2 can include a Universal Asynchronous Receiver/Transmitter (UART) interface 11, 12 respectively, that are interconnected by means of two wires Tx, Rx. In this case, the communication controller P1 also includes a UART interface 13 that is connected to at least the Rx wire of interface I1, in order to receive data emitted by the input device ID.

According to a second aspect of embodiments of the present invention, when a transaction involving transaction data is performed the user is required to enter the transaction data, for example the amount of money that the user wishes to pay, which will hereinafter be designated "Agreed Transaction Data" AGT.

According to a third aspect of embodiments of the present invention, the communication controller P1 is configured to monitor transaction data TD sent to the external device ED or received from the external device, and to intervene in the transaction being processed if such transaction data TD is different from the agreed transaction data ATD that was entered by the user. The "intervention" of the communication controller may include interrupting of the transaction, refusing to send data to the external device, or the like, and generally speaking, performing any action that aims to protect the user from transactions involving transaction data that is different from the transaction data agreed by the user.

Different implementation examples will now be described with reference to FIGS. 3A, 3B, 4, 6A, and 6B.

In these embodiment examples, the controller P1 receives incoming data frames IDF that are in a format of the type "{x[IAD]x}" from the external device ED, wherein IAD is incoming application data to the attention of the application processor P2 and "x" is encapsulation data used by the communication controller P1 and the external device ED to manage the communication. For example, encapsulation data may include a Start of Frame (SOF), an End Of Frame (EOF), NFC commands, Cyclic Redundancy Check (CRC) signature, or the like. Incoming application data IAD, included in incoming data frames IDF, is de-encapsulated by the communication controller P1 and supplied to the application processor P2.

Likewise, the controller P1 sends to the external device ED outgoing data frames ODF in a format of the type "{x[OAD]x}" wherein OAD is outgoing application data and "x" is encapsulation data. Outgoing encapsulated application data OAD is supplied by the application processor P2 to the communication controller P1 by means of commands of the type SEND_DATA [OAD].

For simplicity, the communication controller will be called "P1", the application processor "P2", and the external device "ED". An incoming data frame will be called an "IDF" and an outgoing data frame called "ODF"; incoming application data will be called "IAD" and outgoing application data "OAD". Agreed transaction data will be called "ATD".

Figure 3A:
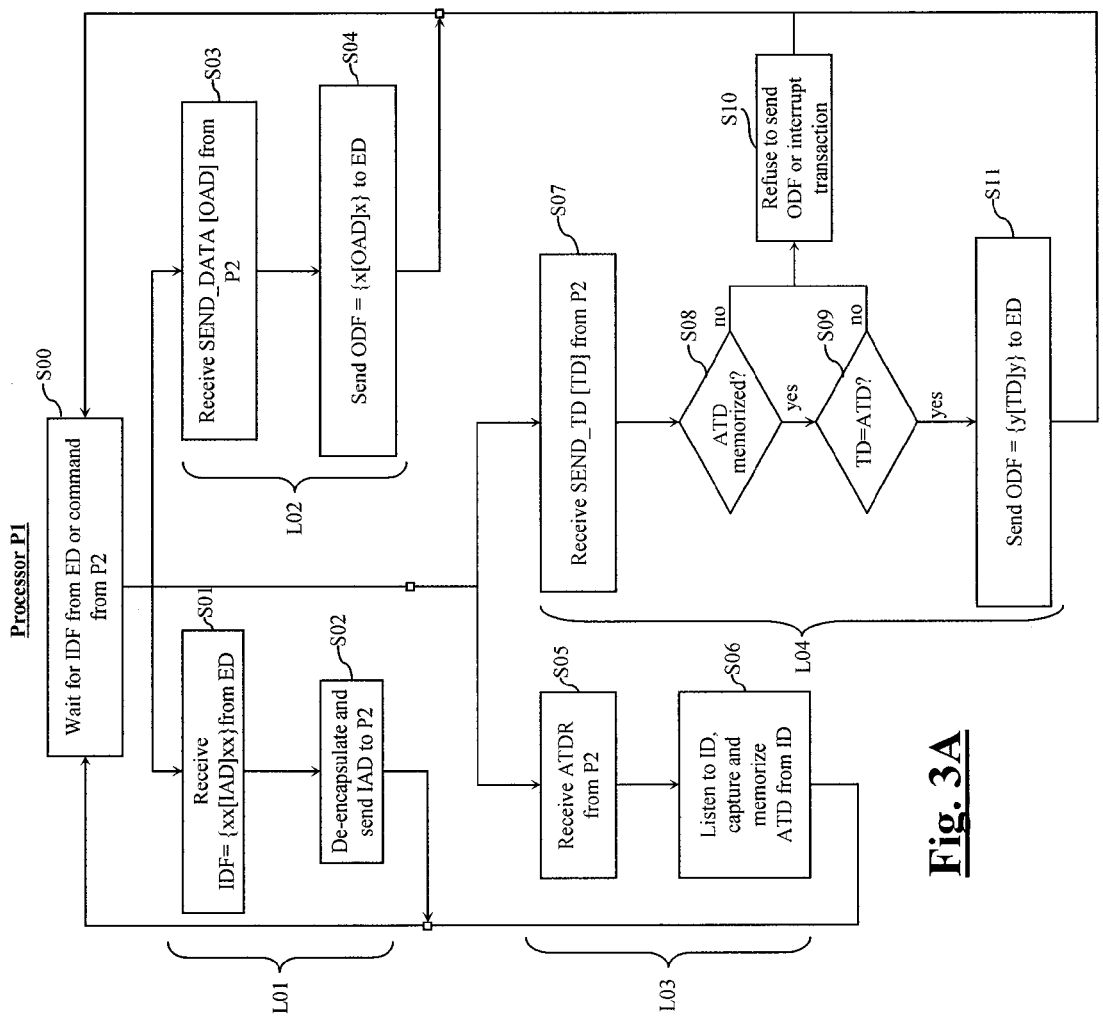
FIGS. 3A-3B are simplified flowcharts describing a method for securing a transaction according to a first embodiment of the present invention.

FIG. 3A is a simplified flowchart describing processing steps performed by P1 in the course of a transaction. One can observe different processing loops:

a processing loop L01 including steps S01 and S02,
a processing loop L02 including steps S03 and S04,
a processing loop L03 including steps S05 and S06, and
a processing loop L04 including steps S07 to S11.

Loops L01 and L02 include conventional processing steps and loops L03 and L04 are provided to implement aspects of embodiments of the present invention. These processing loops are linked to an initial wait step S00 in which the controller P1 waits for an incoming data frame IDF from the ED or for a command from P2.

The processing loop L01 is performed when P1 receives an IDF from the ED, i.e., encapsulated incoming application data {x[IAD]x}, in step 01. P1 then de-encapsulates the IAD and sends the IAD to P2 in step 02.

The processing loop L02 is performed when P1 receives a command SEND_DATA [OAD] from P2, in step S03. P1 then sends to the ED an ODF including the encapsulated OAD {x[OAD]x}, in step 04.

The processing loop L03 is performed when P1 receives a specific command ATDR ("Agreed Transaction Data Request") from P2, in step S05. This command informs P1 that P2 will prompt the user to enter the ATD using the input device ID. In response to this command, P1 monitors the input device ID, then captures and stores the data supplied by the input device ID as agreed transaction data ATD entered by the user.

The processing loop L04 is performed when P1 receives from P2 a specific command SEND_TD [TD] including transaction data TD, in step S07. This command requires P1 to send to ED a specific ODF in a format of the type {y[TD]y} or {y[TD]x} or {x[TD]y} wherein "y" is encapsulating data that is different from the usual "x" encapsulation data.

When such a command is received, P1 first checks whether ATD has been stored (step S08), that is, whether the processing loop L03 has already been performed. Two situations can occur:

1) If P1 does not contain stored agreed transaction data ATD, the received command SEND_TD is regarded as suspect and is rejected. Moreover, if a higher level of security is desired, the reception of such a command when no agreed transaction data has been stored can be considered as an inacceptable breach in the security of the transaction and consequently P1 can be configured to cause a complete interruption of the transaction instead of merely rejecting the command. Thus, P1 goes to step S10 in which it sends to P2 information indicating that it refuses to send the ODF containing the non-agreed transaction data TD or in which it completely interrupts the transaction. P1 then returns to the wait step S00.

2) If the agreed transaction data ATD has been stored, P1 verifies whether the ATD and the transaction data TD in the command are identical. If the data are not identical, P1 goes to step S10 to indicate to P2 that it refuses to send the ODF containing the non-agreed transaction data TD or else interrupts the transaction. P1 then returns to the wait step S00. If the agreed transaction data ATD and the transaction data TD are identical, P1 sends the ODF to the ED in the form {y[TD]y} or {y[TD]x} or {x[TD]y}, then returns to step S00.

Those skilled in the art will note that an additional security mechanism can be provided in the external device ED so as to ensure that no transaction data TD will be accepted if it is not encapsulated in a data frame containing the specific "y" encapsulation data. In another embodiment, it may be provided that the terminal ED generates a random value or "token" at the beginning of a transaction and forwards it to P1, and that transaction data are accepted by the ED only if the transaction data is accompanied by this "token".

Figure 3B:
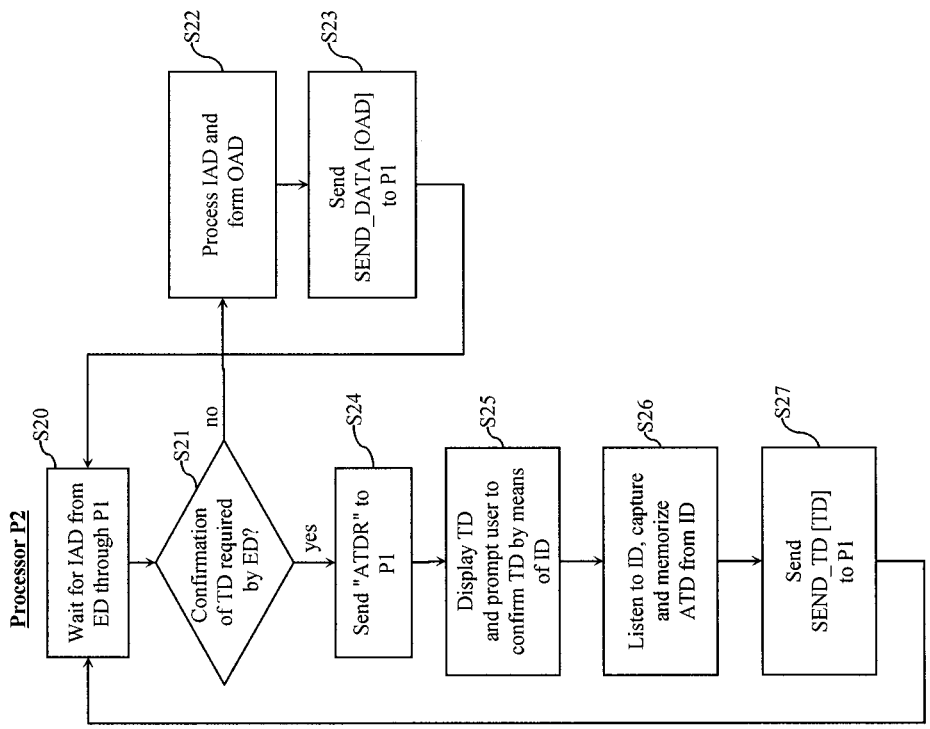

FIG. 3B is a simplified flowchart describing processing steps performed by P2 in the course of a transaction, these steps correspond to the steps described above in connection with FIG. 3A. Steps S20 to S27 are shown. In step S20, P2 waits for incoming application data IAD, which is transmitted by P1 after de-encapsulation (step S02 in FIG. 3A) from the ED. When IAD is received, P2 goes to step S21 in which P2 analyzes the IAD and checks whether transaction data TD is required by the ED. Two situations can occur:

1) If at this step of the transaction no transaction data is requested by the ED, P2 goes to step S22 in which it processes the IAD and forms outgoing application data OAD to the attention of the ED. Such processing of the IAD, until the formation of the OAD, may include different sub-steps that are not shown for the sake of simplicity. In particular, these sub-steps may include displaying different information and/or data to the user via the display device DD and capturing data entered by the user via the input device ID. Insofar as the data entered by the user is not sensitive transaction data TD, it is not necessary that P1 be involved in this processing. In step S23, P2 sends the command SEND_DATA [OAD] to P1 (which is handled by P1 in steps S03, S04 in FIG. 3A). P2 then returns to the wait step S20.

2) If the IAD contains a request for transmitting transaction data TD, P2 goes to step S24 in which it sends the command ATDR to P1 (compare step S05 in FIG. 3A). P2 then proceeds to step S25 in which it uses the display device DD to prompt the user to enter the agreed transaction data ATD. In step S26, which occurs simultaneously to step S06 in FIG. 3A, P2 monitors the input device ID, then captures and stores the agreed transaction data ATD. In step S27, which corresponds to step S07 in FIG. 3A, P2 sends the command SEND_TD [TD] to P1. Transaction data TD included in this command is assumed to be the agreed transaction data ATD entered by the user. If malicious software in the program memory PMEM2 of P2 tries to corrupt the transaction data present in the SEND_TD command, the communication controller will detect the corrupted transaction data in step S08 or S09 in FIG. 3A.

Figure 4:
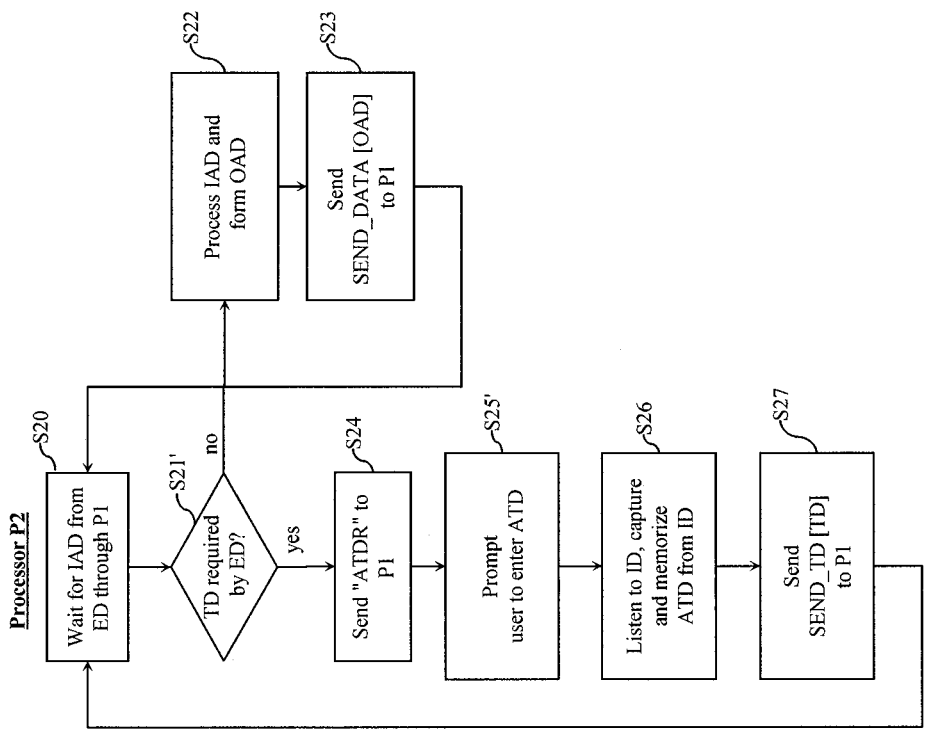
FIG. 4 is a simplified flowchart describing a method for securing a transaction according to a second embodiment of the present invention.

The transaction process described above includes a confirmation of the transaction data by the user in step S25. FIG. 4 is a simplified flowchart representing processing steps performed by P2 in a method for securing a transaction according to a second embodiment of the present invention. This flowchart is identical to the flowchart of FIG. 3B, except that step S21 and step S25 are replaced by step S21' and step S25' respectively. In this embodiment, the ED simply requests that the user indicate the amount of the transaction data involved in the current transaction. This may occur, for example, when the transaction device is used to withdraw money from a cash machine without requiring the user to enter the amount of money to be withdrawn on an input device of the cash machine. In this case, the input device of the transaction device is used as the input device of the cash machine. Thus, in step S21' the IAD received by P2 simply contains a request requiring that the transaction data involved in the transaction be communicated to the external device ED. In step S25', P2 prompts the user to enter the desired transaction data instead of prompting the user to confirm the transaction data.

Figure 5:
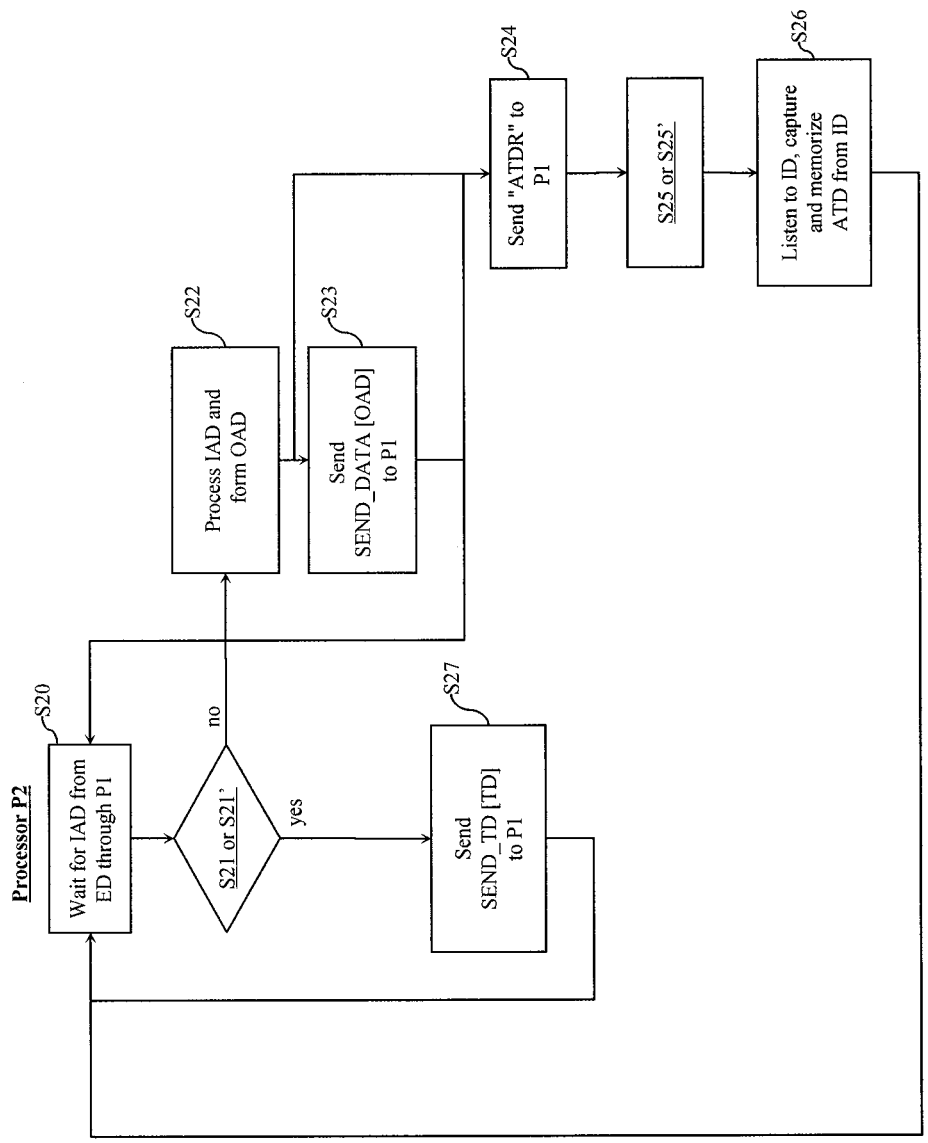
FIG. 5 is a simplified flowchart describing a variant of the methods shown in FIGS. 3B and 4.
Figure 6:
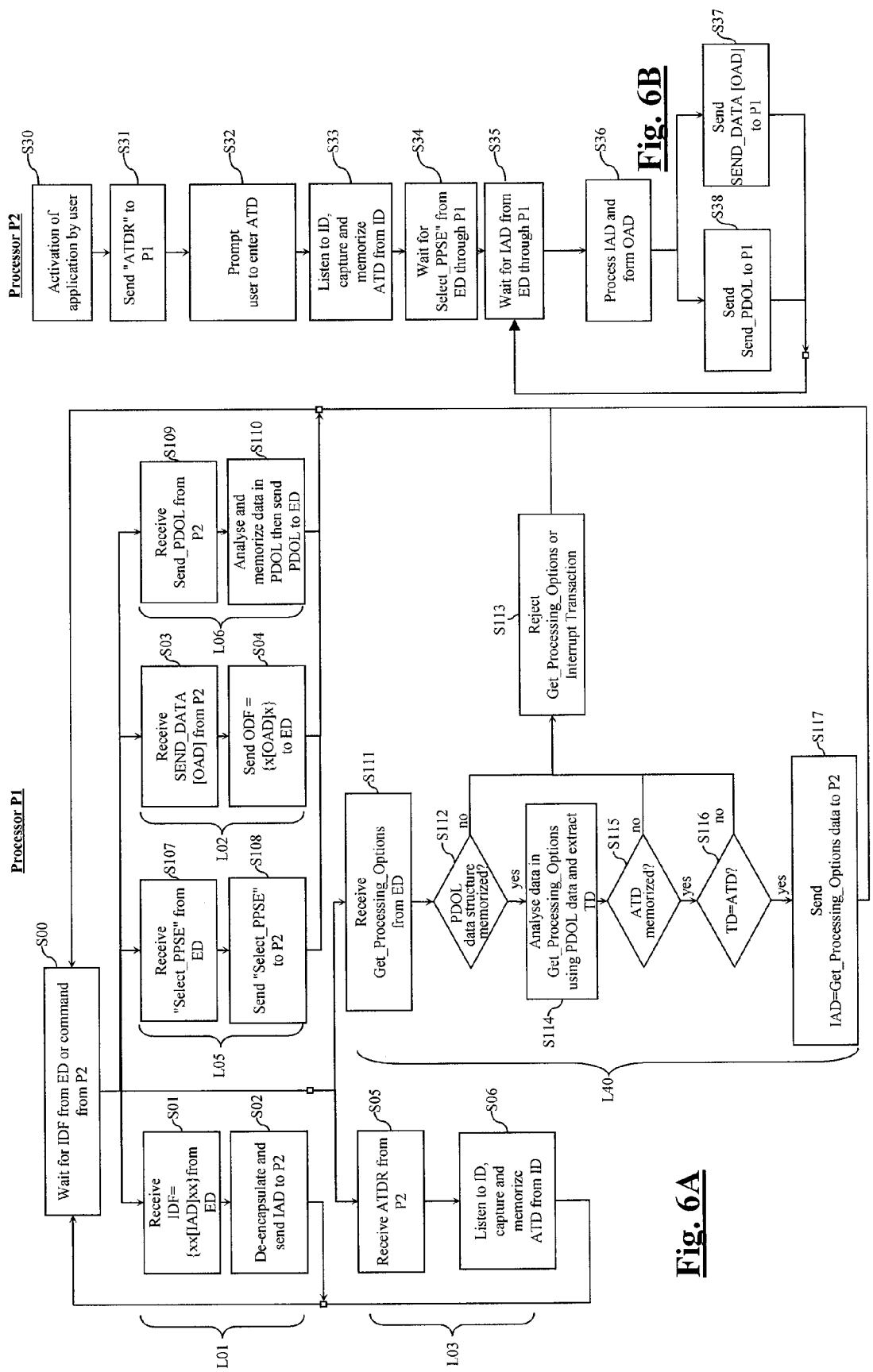
FIGS. 6A-6B are simplified flowcharts describing a method for securing a transaction according a third embodiment of the present invention.

It will be apparent to those skilled in the art that different variants of the above-described embodiments can be envisaged. For example, as shown in FIG. 5, the processor may return to the wait step S20 after having captured the ATD in step S26, instead of going to step S27. In this case, steps S24-S26 may be performed in advance, before P2 has received from the ED a request for confirmation of TD (step S21) or a request to send TD (step S21'), and step S27 may be performed when P2 receives the request for confirmation of TD (step S21) or for sending TD (step S21').

FIGS. 6A and 6B are simplified flowcharts showing an embodiment of the present invention provided in connection with the well-known payment specifications "EMV Book 3" (http://www.emvco.com/documents/specification/view/EMVv4.1Book3ApplicationSpecification.pdf).

FIG. 6A shows processing steps performed by the communication controller P1 during an EMV transaction including aspects of the method in accordance with an embodiment of the present invention. In this embodiment, the transaction device is used as a payment card compliant with the EMV specification. The external device ED is assumed to also be EMV-compliant and may be, for example, an EMV terminal.

This embodiment includes the use of a specific data string called "PDOL" (Processing Options Data Object List) that is forwarded to the external device ED by the transaction device to define the structure of the fields present in a command called "Get_Processing_Options" that is to be sent by the external device to communicate the transaction data. As defined in the EMV specification, the PDOL is a list of tags and lengths of external device-resident data elements required by the transaction device to process the Get_Processing_Options command.

The flowchart of FIG. 6A contains processing loops L01, L02, and L03 that have been described above in connection with FIG. 3A, as well as processing loops L05, L06 and L40.

Loop L05 includes steps S107 and S108. In step S107, P1 receives a SELECT_PPSE command ("Proximity Payment Systems Environment") from the ED. This command indicates that the transaction has begun. In step S108, P1 forwards the SELECT command to P2 to inform P2 that the transaction has begun.

Loop L06 includes steps S109 and S110. In step S109 P1 receives the Send_PDOL command from P2. In step S110 P1 analyzes and stores the data structure present in the PDOL field then forwards the PDOL to the ED, for example, via an ODF of the type {x[PDOL]x}.

Loop L40 replaces L04 previously described and contains security steps according to this particular embodiment of the invention. Unlike loop L04, which aims to detect a corruption of the transaction data by monitoring the outgoing application data OAD forming or comprising such transaction data TD, the loop L40 aims at detecting a corruption of the transaction data by monitoring the incoming application data IAD present in the Get_Processing_Options command sent by the external device ED.

More particularly, loop L40 includes a step S111 in which P1 receives the Get_Processing_Options command from the ED, and a step S112 in which P1 determines whether the PDOL data structure has been previously stored. If the PDOL data structure has not been stored, P1 goes to a step S113 where it interrupts the transaction or rejects the Get_Processing_Options command, for instance by indicating to the ED that the transaction data in the Get_Processing_Options command is invalid. If the PDOL data structure has been stored, P1 goes to a step S114 in which it analyzes the data present in the Get_Processing_Options command so as to extract, for example, the amount of the transaction and the currency involved in the transaction, representing the transaction data TD. For example, "0x9F02" indicates the amount of the transaction and "0x5F2A" indicates the currency of the transaction. In a step S115, P1 verifies whether agreed transaction data ATD has been stored, i.e., whether loop L03 including step S05 (Receive ATDR from P2) and step S06 (monitor the ID, capture and store ATD) has already been performed. If step S06 has not been performed, P1 goes to step S113 in order to interrupt the transaction or to reject the Get_Processing_Options command. If transaction data ATD have been stored, P1 goes to a step S116 in which it verifies whether the transaction data TD (here the amount of money and the currency) is equal to the agreed transaction data ATD. If the data is not equal, P1 goes to step S113 to interrupt the transaction or to reject the Get_Processing_Options command. If the data is equal, P1 sends the Get-Processing-Options to P2 so that P2 can finalize the transaction.

FIG. 6B is a flowchart showing processing steps performed by the application processor P2 during the same EMV transaction. During preliminary steps that are not shown in FIG. 6B, the amount and currency of the transaction—i.e., the transaction data—are communicated verbally or visually to the user by a retailer or a shopkeeper. Then, the user activates the transaction application program in the transaction mobile, for example, by pressing a specific button on the transaction device or by selecting an option in the general menu displayed on the display device DD. This action causes the processor P2 to activate the application program during a step S30. P2 then sends the ATDR command to P1 in a step S31. In a following step S32, P2 prompts the user to enter the agreed transaction data ATD. Then, in a step S34, P2 monitors the ID, then captures and stores data supplied by the ID as agreed transaction data ATD entered by the user (step S33 takes place simultaneously with step S06 in FIG. 6A). In a further step S34, P2 waits for the Select_PPSE command from the ED that confirms the start of the transaction. It is assumed here that the user, after having activated the transaction program, has brought the transaction device closer to the external device ED so that both are inductively coupled and can exchange data.

When the Select_PPSE command is received, P2 goes to a step S35 in which it waits for the IAD from the ED through P1. When IAD is received, P2 goes to a step S36 in which it processes the IAD and forms outgoing application data OAD to the attention of the ED. After step S36, and according to the nature of the application data being processed, P2 either goes to a step S37 in which it sends the command SEND_DATA [OAD] to P1 (which handles this command in steps S03, S04 in FIG. 6A) or goes to a step S38 in which it sends the command SEND_PDOL to P1 (which handles this command in steps S109, S110 in FIG. 6A), then returns to the wait step S35.

Figure 7:
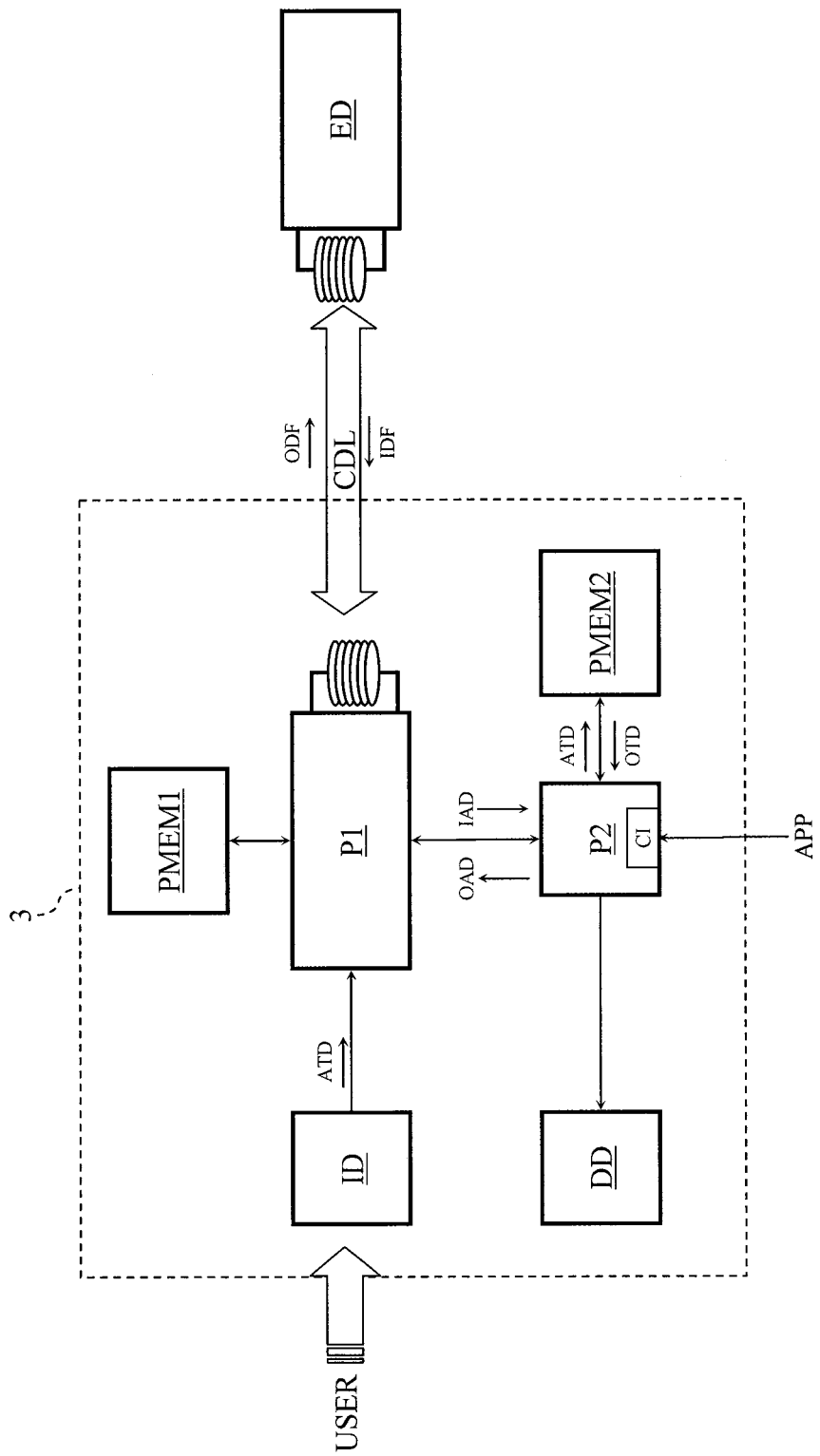
FIG. 7 is a schematic block diagram of a transaction device according to certain other preferred embodiments of the present invention.

It will clearly appear to those skilled in the art that numerous other embodiments of the transaction device and methods for securing a transaction can be anticipated. As an example, FIG. 7 shows another embodiment of a transaction device 3, which includes the same elements as described above in connection with FIG. 2, that is, the communication controller P1 and its memory PMEM1, the application processor P2 and its memory PMEM2, the input device ID, and the display device DD. The transaction device of FIG. 7 differs from transaction device 2 in that the input device ID is connected only to the communication controller P1 and is linked to the application processor P2 through controller P1.

In this embodiment of the transaction device, a transaction is processed in essentially the same manner as described above in connection with FIGS. 3A to 6B, except that the communication controller P1 is configured to forward to the application processor P2 all types of data entered by the user via the input device ID, for processing by the application processor P2, not just the agreed transaction data ATD. Since recent NFC chipset architectures are commonly based on a Host Control Interface (HCI) protocol, according to which the communication controller P1 is configured to route data between the different processors of an NFC chipset, (as proposed by applicant's European patent application EP 1 855 389), P1 can also be configured to route data issued by the input device ID to processor P2.

Transaction data that may be protected by embodiments of the present invention are generally an amount of money and the corresponding currency, but may also be, for example, a number of "units" or "tokens" having a monetary value, a quantity of goods ordered during the transaction, and generally speaking any essential data involved in a transaction and subject to the agreement of the user.

Finally, although embodiments of the present invention were initially conceived and developed for portable devices having an NFC communication controller, it will be apparent to those skilled in the art that the transaction methods that have been described are applicable to other transaction devices using different methods of communicating with external devices and implementing different standards of communication.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for securing a transaction between a transaction device and an external device, the transaction device including a Near Field Communication (NFC) controller, an application processor, and an input device to allow a user to enter transaction data associated with the transaction, the method comprising:
    requiring, by the application processor directly coupled to the NFC controller, a user to enter transaction data associated with the transaction via an input device,
    storing, by the application processor, the transaction data entered by the user;
    sending, by the application processor, the transaction data to the external device through the NFC controller, or receiving, by the application processor, the transaction data from the external device through the NFC controller,
    receiving, by the NFC controller, via a contactless channel, contactless incoming data frames from the external device,
    de-encapsulating, by the NFC controller, the incoming data frames to extract incoming application data therefrom, or encapsulating, by the NFC controller, outgoing application data supplied by the application processor in one or more outgoing data frames via the contactless channel to the external device; and
    forwarding, by the NFC controller, the incoming application data to the application processor, or sending, by the NFC controller, the one or more outgoing data frames via the contactless channel to the external device;

capturing and storing, by the NFC controller, the transaction data entered by the user;

monitoring, by the NFC controller, the transaction data to be sent to the external device or the transaction data received from the external device; and refusing, by the NFC controller, to execute a send command from the application processor to send the transaction data to the external device if the transaction data to be sent is different from the transaction data entered by the user, or refusing, by the NFC controller, to forward to the application processor a command sent by the external device and comprising the received transaction data if the received transaction data is different from the transaction data entered by the user.

2. The method of claim 1, further comprising:
prior to requiring the user to enter the transaction data, sending, by the application processor, a command requesting the NFC controller to capture the transaction data entered by the user.

3. The method of claim 1, further comprising:
(i) rejecting, by the external device, transaction data that is not encapsulated with the predetermined encapsulation data when the predetermined encapsulation data is expected; or
(ii) rejecting, by the external device, transaction data that is not accompanied by the predetermined accompanying data when the predetermined accompanying data is expected.

4. The method of claim 1, further comprising:
sending transaction data to the transaction device using a predetermined data frame; and
in response to reception of the predetermined data frame, comparing, by the NFC controller, the transaction data present in said predetermined data frame to the transaction data entered by the user.

5. The method according to claim 1, wherein the transaction data entered by the user is captured simultaneously by the application processor and the NFC controller.

6. A transaction device comprising:
an NFC controller;
an application processor configured to perform a transaction using the NFC controller, the application processor being directly connected to the NFC controller; and
an input device configured to allow a user to enter transaction data associated with the transaction, wherein
the application processor is further configured to:
require a user to enter transaction data via the input device,
store the transaction data entered by the user;
send the transaction data to an external device through the NFC controller, or receive transaction data from the external device through the NFC controller; and
the NFC controller is configured to:
(a)(i) receive, via a contactless channel, contactless incoming data frames from the external device,
(a)(ii) de-encapsulate the incoming data frames to extract incoming application data therefrom, and
(a)(iii) forward the incoming application data to the application processor, or:
(b)(i) encapsulate outgoing application data supplied by the application processor in one or more outgoing data frames, and
(b)(ii) send the one or more outgoing data frames via the contactless channel to the external device;
(c) capture and store the transaction data entered by the user, when the user is required by the application processor to enter transaction data via the input device;
(d) monitor the transaction data to be sent to the external device or the transaction data received from the external device; and
(e) refuse to execute a command from the application processor to send the transaction data to the external device if the transaction data to be sent is different from the transaction data entered by the user, or refuse to reject the received transaction data that is different from the transaction data entered by the user.

7. The transaction device of claim 6, wherein the application processor is further configured to require the user to enter the transaction data, and to apply to the NFC controller a command requesting the NFC controller to capture and store the transaction data entered by the user before requiring the user to enter the transaction data.

8. The transaction device of claim 6, wherein:
the application processor is configured to apply a predetermined command to the NFC controller when transaction data is to be sent to the external device, and to provide the NFC controller with the transaction data to be sent, and
the NFC controller is configured to monitor the transaction data in response to the predetermined command, and then send the transaction data to be sent using one of a predetermined encapsulation data or a predetermined accompanying data if the transaction data to be sent is identical to the transaction data entered by the user.

9. The transaction device of claim 6, wherein the NFC controller is configured to, in response to the reception of a predetermined data frame including transaction data, compare the transaction data present in the predetermined data frame to the transaction data entered by the user.

10. The transaction device of claim 6, wherein the application processor is one of a baseband processor of a mobile phone and the main processor of a Personal Digital Assistant.

11. The transaction device of claim 6, wherein the input device is coupled to both the application processor and the NFC controller, and the transaction data entered by the user is captured simultaneously by the application processor and the NFC controller.

12. A transaction system comprising:
a transaction device configured to require a user to enter transaction data via an input device in the course of a transaction, the transaction device including:
an NFC controller,
an application processor to perform transactions with an external device through the NFC controller and the input device, the application processor being configured to:
require a user to enter transaction data via the input device;
store the transaction data entered by the user; and
send the transaction data to an external device through the NFC controller, or receive transaction data from the external device through the NFC controller;
wherein
the NFC controller is configured to:
receive, via a contactless channel, contactless incoming data frames from the external device,
de-encapsulate the incoming data frames to extract incoming application data therefrom, or encapsulate outgoing application data supplied by the application processor in one or more outgoing data frames via the contactless channel to the external device, and forward the incoming application data to the application processor, or send the one or more outgoing data frames via the contactless channel to the external device;

capture and store the transaction data entered by the user, monitor the transaction data to be sent to the external device or the transaction data received from the external device, and refuse to execute a send command from the application processor to send transaction data to the external device if the transaction data to be sent is different from the transaction data entered by the user, or refuse to forward to the application processor a command sent by the external device, the command comprising the received transaction data if it is different from the transaction data entered by the user; and an external device configured to perform a transaction with the transaction device.

13. The transaction system of claim 12, wherein the external device is configured to:

(i) reject transaction data that is not encapsulated with predetermined encapsulation data when the predetermined encapsulation data is expected; or (ii) reject transaction data that is not accompanied with predetermined accompanying data when the predetermined accompanying data is expected.

14. The transaction system of claim 13, wherein the external device is configured to send application data to the transaction device using a predetermined data frame.

15. A transaction device comprising:

an NFC controller;

an application processor to perform transactions with an external device through the NFC controller, the application processor being directly coupled to the NFC controller; and an input device, wherein the NFC controller is configured to:

receive, via a contactless channel, contactless incoming data frames from the external device, de-encapsulate the incoming data frames to extract incoming application data therefrom, or encapsulate outgoing application data supplied by the application processor in one or more outgoing data frames via the contactless channel to the external device, and forward the incoming application data to the application processor, or send the one or more outgoing data frames via the contactless channel to the external device, wherein the application processor is configured to:

require a user to enter transaction data via the input device in the course of a transaction, store the transaction data;

send the transaction data to the external device through the NFC controller, or receive transaction data from the external device through the NFC controller;

and wherein the NFC controller is further configured to:

capture and store the transaction data entered by the user, monitor the transaction data to be sent to the external device or the transaction data received from the external device, and interrupt the transaction if the transaction data to be sent to the external device is different from the transaction data entered by the user or the received transaction data is different from the transaction data entered by the user.

* * * * *

UNITED STATES PATENT AND TRADEMARK OFFICE
CERTIFICATE OF CORRECTION

PATENT NO. : 9,122,868 B2  
APPLICATION NO. : 12/534944  
DATED : September 1, 2015  
INVENTOR(S) : Jean-Bernard Blanchet Page 1 of 1

It is certified that error appears in the above-identified patent and that said Letters Patent is hereby corrected as shown below:

IN THE SPECIFICATION

Column 5, lines 28-32 of the issued patent should read:

Transmitter (UART) interface I1, I2 respectively, that are interconnected by means of two wires Tx, Rx. In this case, the communication controller P1 also includes a UART interface I3 that is connected to at least the Rx wire of interface I1, in order to receive data emitted by the input device ID.

Signed and Sealed this  
Nineteenth Day of January, 2016

Michelle K. Lee  
*Director of the United States Patent and Trademark Office*

UNITED STATES PATENT AND TRADEMARK OFFICE
CERTIFICATE OF CORRECTION

PATENT NO. : 9,122,868 B2  
APPLICATION NO. : 12/534944  
DATED : September 1, 2015  
INVENTOR(S) : Jean-Bernard Blanchet et al.

Page 1 of 1

It is certified that error appears in the above-identified patent and that said Letters Patent is hereby corrected as shown below:

In the Claims

In column 12, line 12, in claim 6, replace "reject" and insert --forward--, therefor.

Signed and Sealed this  
Seventh Day of June, 2016

Michelle K. Lee  
*Director of the United States Patent and Trademark Office*